United States Patent
Gorokhov et al.

(10) Patent No.: US 9,026,164 B2
(45) Date of Patent: May 5, 2015

(54) SELECTIVE TRANSMISSION OF POWER DECISION PILOT IN A WIRELESS COMMUNICATION SYSTEM

(75) Inventors: Alexei Y. Gorokhov, San Diego, CA (US); Aamod D. Khandekar, San Diego, CA (US); Ravi Palanki, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 795 days.

(21) Appl. No.: 12/578,066

(22) Filed: Oct. 13, 2009

(65) Prior Publication Data

US 2011/0086663 A1    Apr. 14, 2011

(51) Int. Cl.
*H04B 7/00* (2006.01)
*H04W 52/24* (2009.01)
*H04W 52/32* (2009.01)

(52) U.S. Cl.
CPC .......... *H04W 52/244* (2013.01); *H04W 52/242* (2013.01); *H04W 52/325* (2013.01)

(58) Field of Classification Search
CPC ............ H04W 52/242; H04W 52/244; H04W 52/325; H04W 52/38; H04W 52/18
USPC ................. 455/63.1, 67.13, 69, 522; 370/318
See application file for complete search history.

(56) References Cited

U.S. PATENT DOCUMENTS 6,778,812 B1 * 8/2004 Zhang ......................... 455/67.13
7,720,503 B2 * 5/2010 Kwon et al. .................. 455/522
2001/0053128 A1 * 12/2001 Lee ................................ 370/244
2009/0130980 A1 * 5/2009 Palanki et al. ............... 455/63.1
2009/0197538 A1    8/2009 Borran et al.
2009/0227263 A1    9/2009 Agrawal et al.
2009/0247084 A1 * 10/2009 Palanki ........................ 455/63.1

FOREIGN PATENT DOCUMENTS

| WO | 2007044281 A1 | 4/2007 |
|---|---|---|
| WO | 2009099473 A2 | 8/2009 |
| WO | 2010085814 A1 | 7/2010 |

OTHER PUBLICATIONS

International Search Report and Written Opinion—PCT/US2009/066466, ISA/EPO—Jul. 7, 2011.
Taiwan Search Report—TW098141417—TIPO—Dec. 5, 2012.

* cited by examiner

*Primary Examiner* — Raymond Dean
(74) *Attorney, Agent, or Firm* — Larry Moskowitz

(57) ABSTRACT

Techniques for selectively transmitting a power decision pilot are described. The power decision pilot may be indicative of the transmit power to use for data transmission in a future time interval. The power decision pilot may be transmitted when sufficiently beneficial for channel quality estimation or omitted otherwise. Whether or not to transmit the power decision pilot may be determined based on system type (e.g., heterogeneous or homogeneous system), the presence or absence of a dominant interferer, whether a reduce interference request is received, etc. For example, a base station may transmit a power decision pilot if it causes high interference to a non-served terminal, if a served terminal observes high interference from a neighbor base station, if the base station receives a reduce interference request from a non-served terminal, etc. The power decision pilot may be transmitted if a determination is made to transmit the pilot or omitted otherwise.

18 Claims, 13 Drawing Sheets

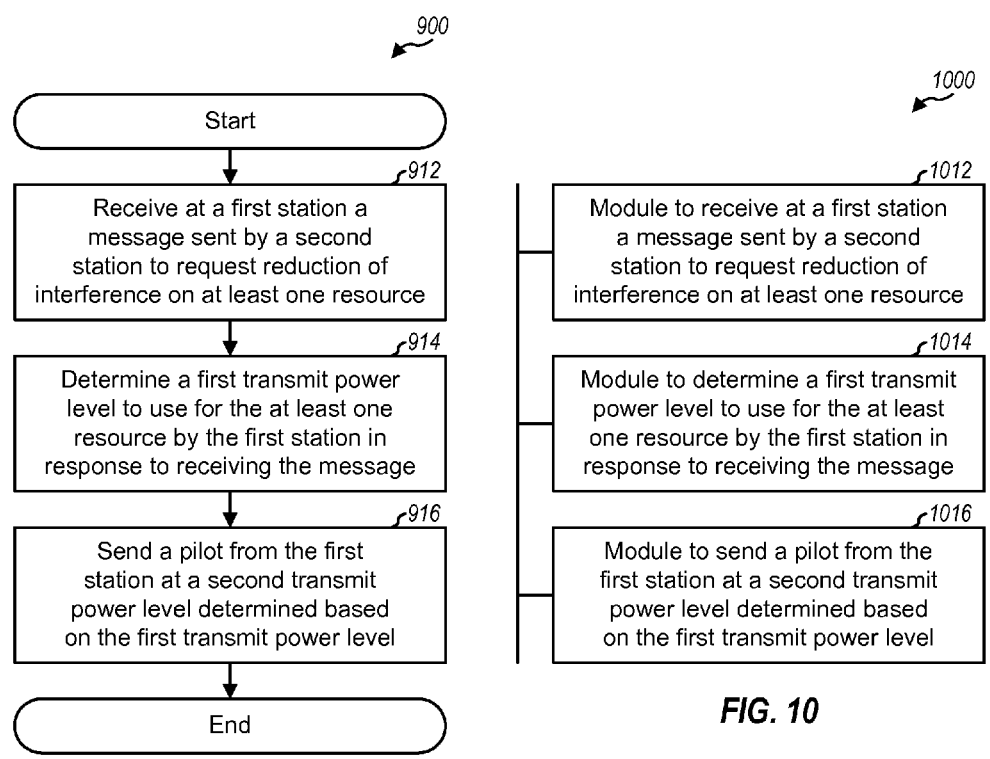

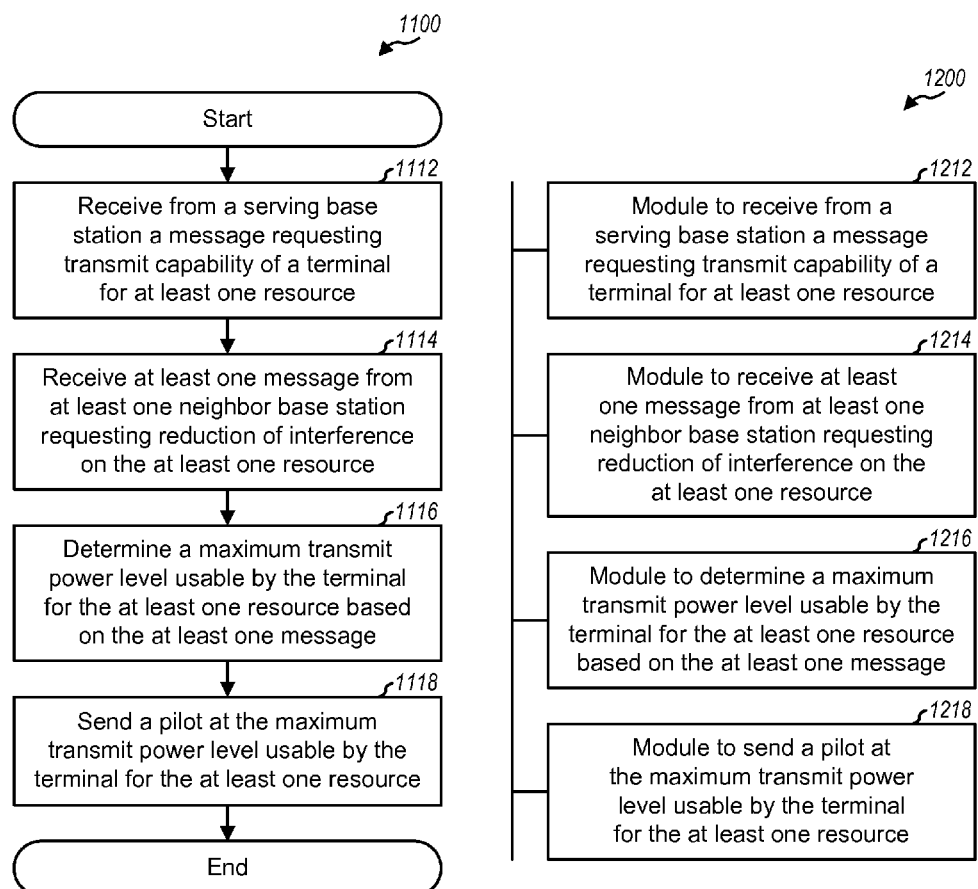

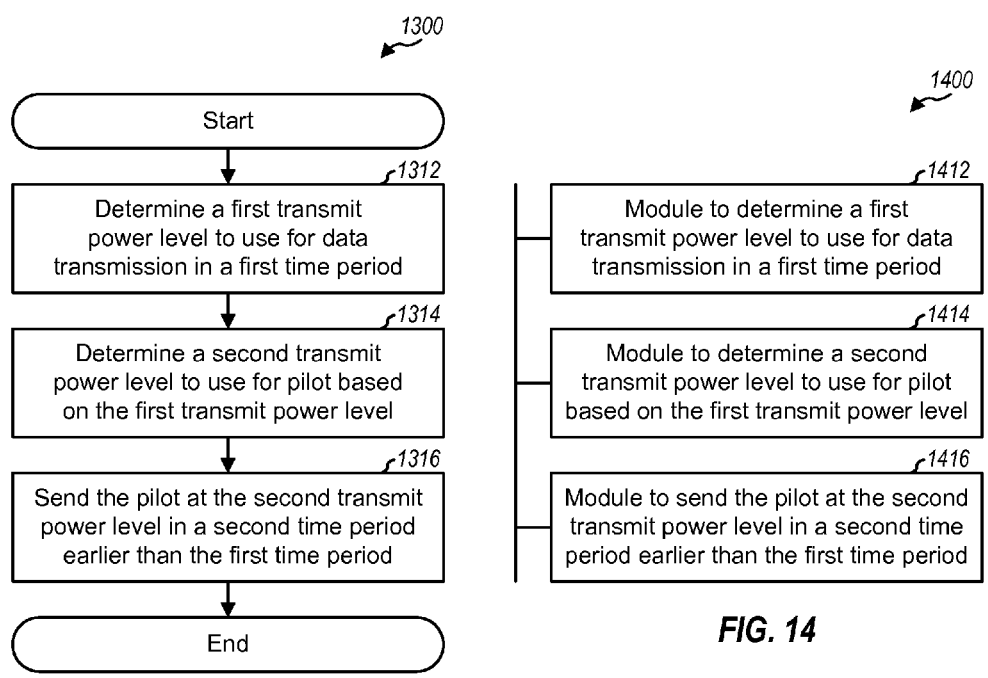

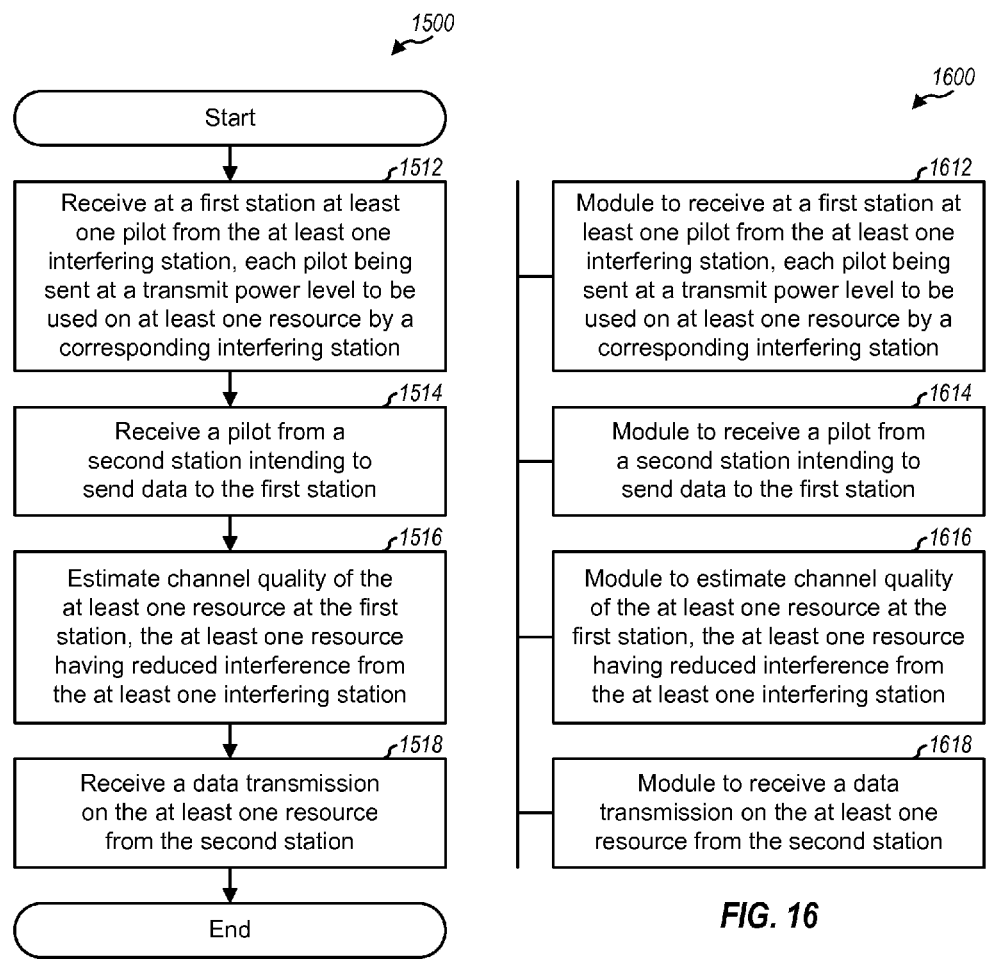

SELECTIVE TRANSMISSION OF POWER DECISION PILOT IN A WIRELESS COMMUNICATION SYSTEM

BACKGROUND

I. Field

The present disclosure relates generally to communication, and more specifically to data transmission techniques for a wireless communication system.

II. Background

Wireless communication systems are widely deployed to provide various communication content such as voice, video, packet data, messaging, broadcast, etc. These wireless systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

A wireless communication system may include a number of base stations that can support communication for a number of terminals. A terminal may communicate with a base station via the forward and reverse links. The forward link (or downlink) refers to the communication link from the base station to the terminal, and the reverse link (or uplink) refers to the communication link from the terminal to the base station.

A base station may transmit data to one or more terminals on the forward link and may receive data from one or more terminals on the reverse link. On the forward link, data transmission from the base station may observe interference due to data transmissions from neighbor base stations. On the reverse link, data transmission from each terminal may observe interference due to data transmissions from other terminals communicating with the neighbor base stations. For both the forward and reverse links, the interference due to interfering base stations and interfering terminals may degrade performance.

There is therefore a need in the art for techniques to mitigate interference in order to improve performance.

SUMMARY

Techniques for selectively transmitting a power decision pilot are described herein. The power decision pilot may be transmitted in a given time interval and may be indicative of the transmit power to use for data transmission in a future time interval. The power decision pilot may improve accuracy of channel estimation but may increase latency in data transmission.

In an aspect, a power decision pilot may be selectively transmitted when sufficiently beneficial and may be omitted otherwise in order to reduce latency. In one design, whether or not to transmit the power decision pilot may be determined based on system type (e.g., heterogeneous or homogeneous system), the presence or absence of a dominant interferer, the presence or absence of a reduce interference request, etc. For example, a power decision pilot may be transmitted on the downlink if (i) a base station causes high interference to a terminal not served by the base station, (ii) a terminal served by the base station observes high interference from a neighbor base station, (iii) the base station receives a reduce interference request from a terminal not served by the base station, or (iv) some other criterion is satisfied. A power decision pilot may be transmitted by a terminal on the uplink based on similar criteria. A power decision pilot may be transmitted if a determination is made to transmit the pilot and may be omitted otherwise.

Various aspects and features of the disclosure are described in further detail below.

BRIEF DESCRIPTION OF THE DRAWINGS

FIGS. 9 and 10 show a process and an apparatus, respectively, for sending a power decision pilot.

FIGS. 11 and 12 show a process and an apparatus, respectively, for sending a power decision pilot by a terminal.

FIGS. 13 and 14 show a process and an apparatus, respectively, for advertising transmit power in advance.

FIGS. 15 and 16 show a process and an apparatus, respectively, for receiving a power decision pilot.

DETAILED DESCRIPTION

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). cdma2000 and UMB are described in documents from an organization named "3rd Generation Partnership Project 2" (3GPP2).

Figure 1:
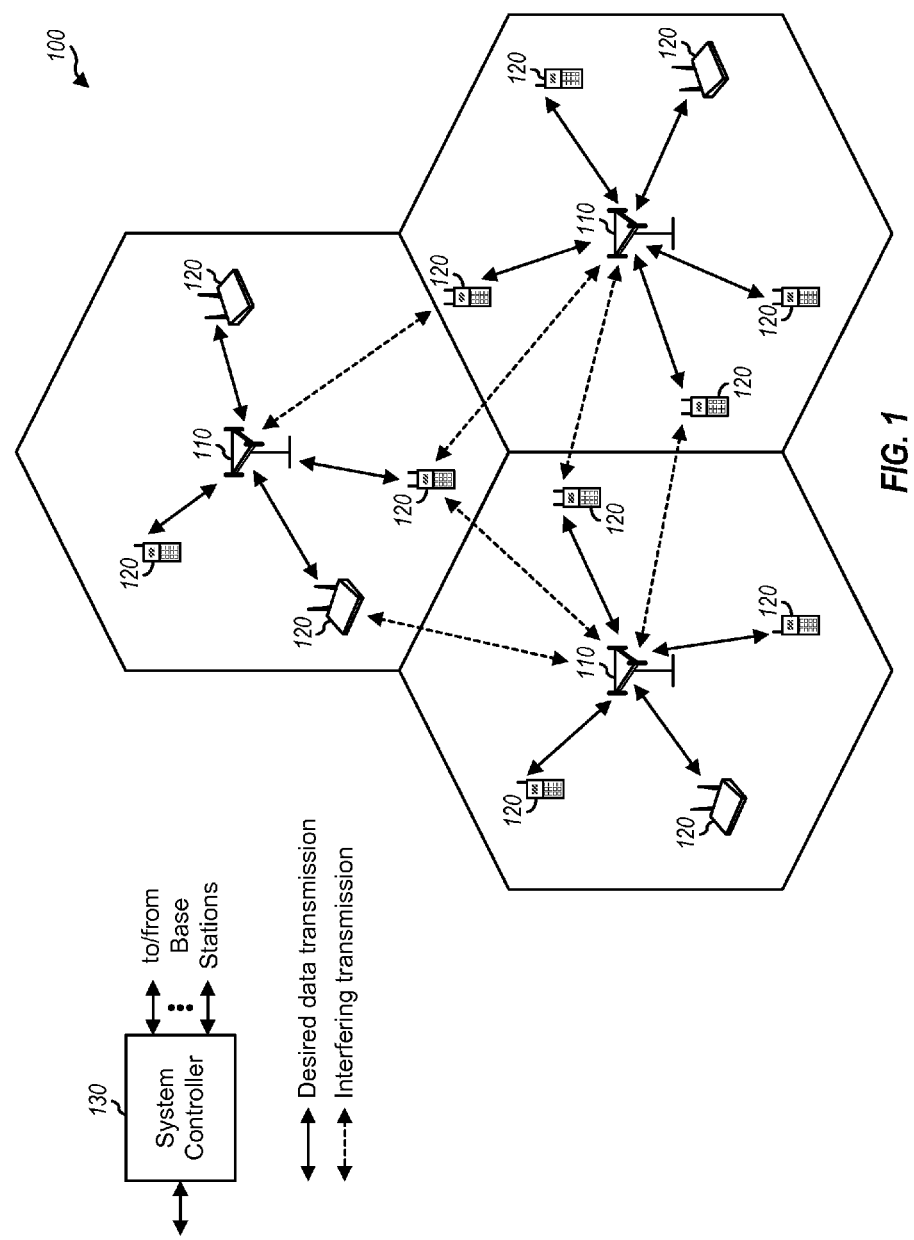
FIG. 1 shows a wireless communication system.

FIG. 1 shows a wireless communication system 100, which may include a number of base stations 110 and other network entities. A base station may be a fixed station that communicates with the terminals and may also be referred to as an access point, a Node B, an evolved Node B, etc. Each base station 110 may provide communication coverage for a particular geographic area. The term "cell" can refer to a coverage area of a base station and/or a base station subsystem serving this coverage area, depending on the context in which the term is used. A base station may provide communication coverage for a macro cell, a pico cell, a femto cell, and/or other types of cell. A macro cell may cover a relatively large geographic area (e.g., several kilometers in radius) and may support communication for all terminals with service subscription in the system. A pico cell may cover a relatively small geographic area and may support communication for all terminals with service subscription. A femto cell may cover a relatively small geographic area (e.g., a home) and may support communication for a set of terminals having association with the femto cell (e.g., terminals belonging to residents of the home). The terminals supported by a femto cell may belong in a closed subscriber group (CSG). The techniques described herein may be used for all types of cell. A base station for a macro cell may be referred to as a macro base station. A base station for a pico cell may be referred to as a pico base station. A base station for a femto cell may be referred to as a femto base station or a home base station.

System 100 may be a heterogeneous system that includes base stations of different types, e.g., macro base stations, pico base stations, femto base stations, relays, etc. These different types of base stations may have different transmit power levels, different coverage areas, and different impact on interference in system 100. For example, macro base stations may have a high transmit power level (e.g., 20 Watts) whereas pico and femto base stations may have a lower transmit power level (e.g., 1 Watt). System 100 may also be a homogeneous system that includes base stations of one type, e.g., only macro base stations or only femto base stations. The techniques described herein may be used for both heterogeneous and homogeneous systems.

A system controller 130 may couple to a set of base stations and provide coordination and control for these base stations. System controller 130 may be a single network entity or a collection of network entities. System controller 130 may communicate with the base stations via a backhaul, which is not shown in FIG. 1 for simplicity.

Terminals 120 may be dispersed throughout the system, and each terminal may be stationary or mobile. A terminal may also be referred to as an access terminal, a mobile station, a user equipment, a subscriber unit, a station, etc. A terminal may be a cellular phone, a personal digital assistant (PDA), a wireless modem, a wireless communication device, a handheld device, a laptop computer, a cordless phone, a wireless local loop (WLL) station, etc. A terminal may communicate with a serving base station and may cause interference to and/or receive interference from one or more interfering base stations. A serving base station is a base station designated to serve a terminal on the forward and/or reverse link. An interfering base station is a base station causing interference to a terminal on the forward link. An interfering terminal is a terminal causing interference to a base station on the reverse link. In FIG. 1, a solid line with double arrows indicates a desired data transmission between a terminal and a serving base station. A dashed line with double arrows indicates an interfering transmission between a terminal and an interfering base station.

The system may support HARQ in order to improve reliability of data transmission. For HARQ, a transmitter may send a transmission of data and may send one or more additional transmissions, if needed, until the data is decoded correctly by a receiver, or the maximum number of transmissions has been sent, or some other termination condition is encountered.

Figure 2:
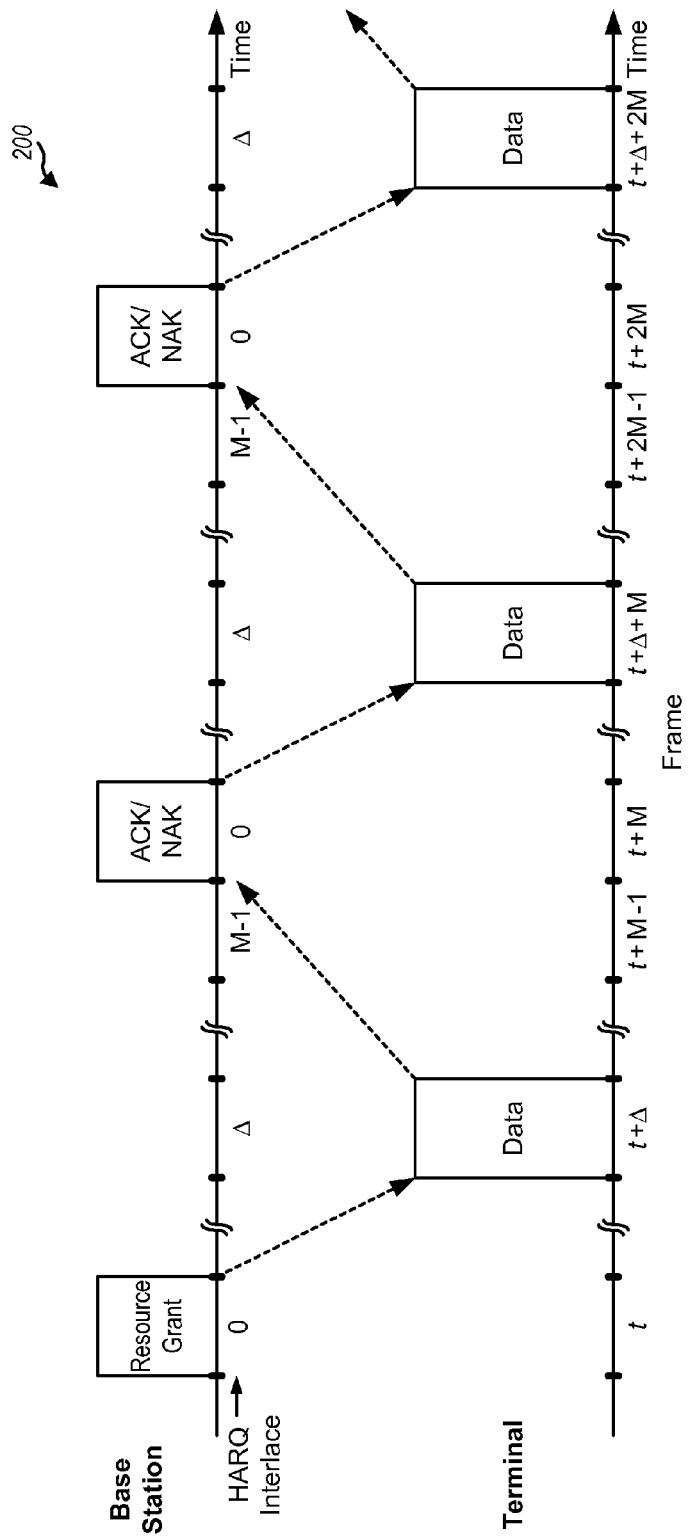
FIG. 2 shows data transmission with hybrid automatic retransmission (HARQ).

FIG. 2 shows an example data transmission on the reverse link with HARQ. The transmission timeline may be partitioned into units of frames. Each frame may cover a predetermined time duration, e.g., 1 milliseconds (ms). A frame may also be referred to as a subframe, a slot, etc.

A terminal may have data to send on the reverse link and may send a resource request (not shown in FIG. 2). A serving base station may receive the resource request and may return a resource grant. The terminal may process a packet of data and send a transmission of the packet on the granted resource. The serving base station may receive the transmission from the terminal and decode the packet. The serving base station may send an acknowledgement (ACK) if the packet is decoded correctly or a negative acknowledgement (NAK) if the packet is decoded in error. The terminal may receive the ACK/NAK feedback, send another transmission of the packet if a NAK is received, and either terminate or send a transmission of a new packet if an ACK is received.

M HARQ interlaces with indices of 0 through M−1 may be defined for each of the forward and reverse links, where M may be equal to 4, 6, 8 or some other integer value. The HARQ interlaces may also be referred to as HARQ instances. Each HARQ interlace may include frames that are spaced apart by M frames. For example, HARQ interlace m may include frames m, m+M, m+2M, etc., where $m \in \{0, \ldots, M-1\}$. A packet may be sent on one HARQ interlace, and all transmissions of the packet may be sent in frames that are spaced apart by M frames. Each transmission of the packet may be referred to as an HARQ transmission.

The M HARQ interlaces for the forward link may be associated with the M HARQ interlaces for the reverse link. In one design, HARQ interlace m on the forward link may be associated with HARQ interlace $r = \{(m+\Delta) \bmod M\}$ on the reverse link, where $\Delta$ is a frame offset between the forward and reverse links, and "mod" denotes a modulo operation. In one design, $\Delta$ may be equal to M/2, and each HARQ interlace on the forward link may be associated with an HARQ interlace on the reverse link that is M/2 frames away.

The system may utilize orthogonal frequency division multiplexing (OFDM) or single-carrier frequency division multiplexing (SC-FDM) for each of the forward and reverse links. OFDM and SC-FDM partition the system bandwidth into multiple (K) orthogonal subcarriers, which are also commonly referred to as tones, bins, etc. The spacing between adjacent subcarriers may be fixed, and the total number of subcarriers (K) may be dependent on the system bandwidth. For example, K may be equal to 128, 256, 512, 1024 or 2048 for system bandwidth of 1.25, 2.5, 5, 10 or 20 MHz, respectively. Each subcarrier may be modulated with data. In general, modulation symbols are sent in the frequency domain with OFDM and in the time domain with SC-FDM.

In one design, the K total subcarriers may be grouped into resource blocks. Each resource block may include N subcarriers (e.g., N=12 subcarriers) in one slot. A slot may span 0.5 ms or some other duration. The available resource blocks may be assigned to the terminals for data transmission.

In another design, a channel tree may be used to identify resources. The channel tree may constrain grouping of resources, which may reduce overhead to convey the resources.

Figure 3:
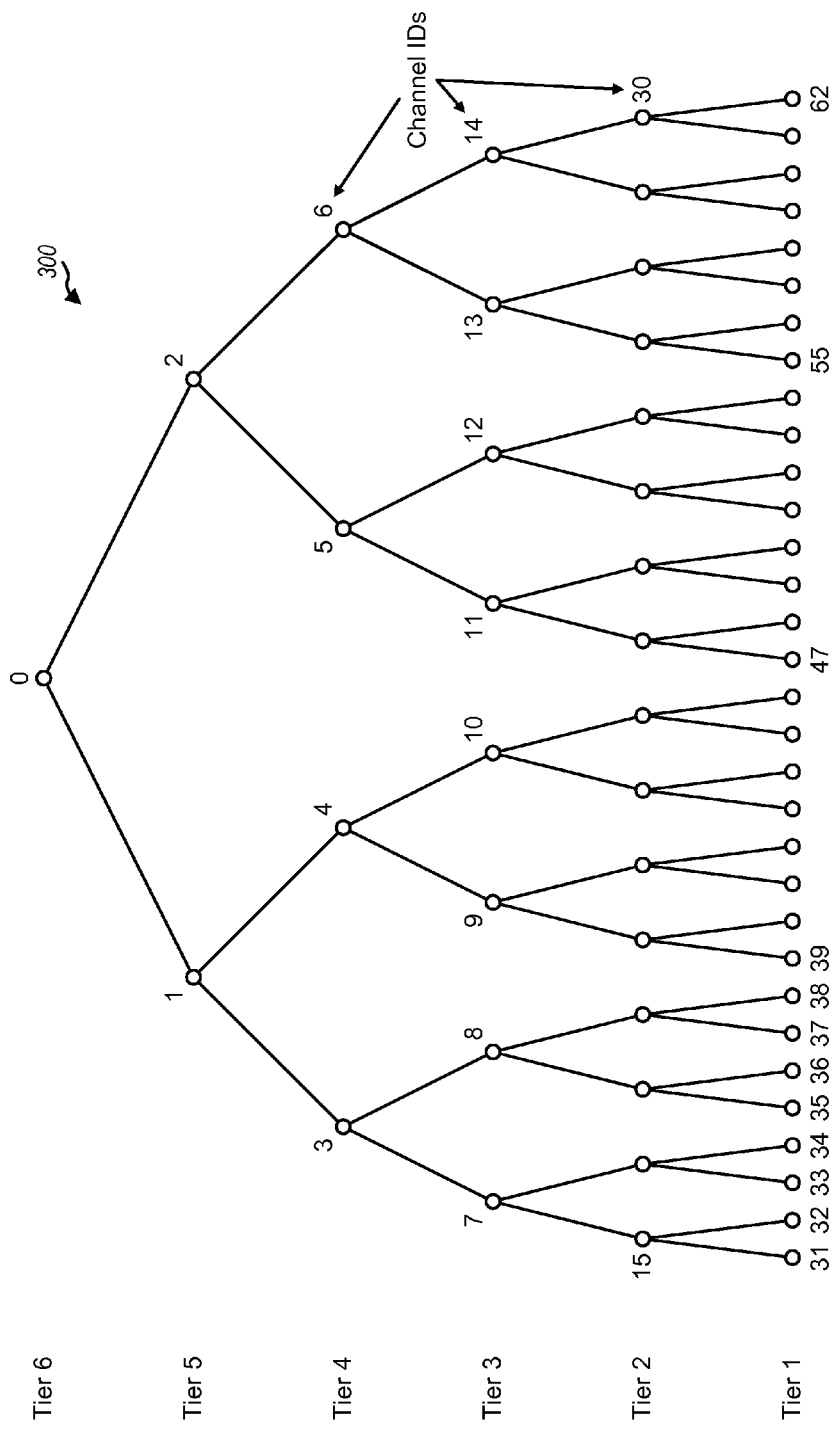
FIG. 3 shows a binary channel tree for a set of subcarriers.

FIG. 3 shows a design of a channel tree 300 for a case in which 32 subcarrier sets are available. Each subcarrier set may include a predetermined number of subcarriers. In channel tree 300, 32 nodes may be formed in tier 1 with the 32 subcarrier sets, 16 nodes may be formed in tier 2 with the 32 nodes in tier 1, eight nodes may be formed in tier 3 with the 16 nodes in tier 2, four nodes may be formed in tier 4 with the eight nodes in tier 3, two nodes may be formed in tier 5 with the four nodes in tier 4, and one node may be formed in tier 6 with the two nodes in tier 5. Each node in tiers 2 through 6 may be formed with two nodes in the tier immediately below.

Each node in the channel tree may be assigned a unique channel identifier (ID). The nodes may be assigned sequentially numbered channel IDs from top to bottom and from left to right for each tier, as shown in FIG. 3. The topmost node may be assigned a channel ID of 0 and may include all 32 subcarrier sets. The 32 nodes in the lowest tier 1 may be assigned channel IDs of 31 through 62 and may be called base nodes.

The tree structure shown in FIG. 3 places certain restrictions on assignment of subcarriers. For each node that is assigned, all nodes that are subsets (or descendants) of the assigned node and all nodes for which the assigned node is a subset are restricted. The restricted nodes are not used concurrently with the assigned node so that no two nodes use the same subcarrier set at the same time.

The available frequency and/or time resources may also be partitioned and identified in other manners. The K total subcarriers may also be partitioned into subbands. Each subband may include a predetermined number of subcarriers, e.g., 72 subcarriers in 1.08 MHz.

A terminal may communicate with a serving base station on the forward and/or reverse link. On the forward link, the terminal may observe high/strong interference from an interfering base station. High interference may be quantified by the measured interference exceeding a particular threshold or based on some other criterion. High interference may be observed on the forward link, e.g., if the serving base station covers a pico cell or a femto cell and has much lower transmit power than the interfering base station. On the reverse link, the serving base station may observe high interference from an interfering terminal. The interference on each link may degrade performance of data transmission sent on that link. The interference mitigation may also steer the interfering transmission away from a station observing high interference.

In an aspect, short-term interference mitigation may be used to mitigate (e.g., to avoid or reduce) interference on a given link in order to improve performance of data transmission. The interference mitigation may blank or reduce transmit power of interfering transmissions so that a higher signal-to-noise-and-interference ratio (SINR) can be achieved for a desired data transmission.

A set of messages and/or a set of control channels may be used to support short-term interference mitigation on the forward link (FL) and reverse link (RL). Table 1 lists a set of messages that may be used for short-term interference mitigation, in accordance with one design. A pilot is a transmission that is known a priori by both a transmitter and a receiver and may also be referred to as a reference signal, a preamble, a training sequence, etc. A pilot may be considered as a message that carries information in the signal itself instead of its content.

TABLE 1

| Message/Pilot | Description |
| --- | --- |
| Interference mitigation trigger | Message sent to a terminal to trigger short-term interference mitigation and to request the terminal to clear interference from interfering base stations on the forward link. |
| Transmit capability request | Message sent to a terminal to request transmit capability of the terminal, e.g., to trigger transmission of a power decision pilot by the terminal on the reverse link. |
| FL resource grant | Message assigning forward link resource to a terminal. |
| RL resource grant | Message assigning reverse link resource to a terminal. |
| Reduce interference request | Message asking interfering base stations or interfering terminals to reduce interference on specified resource(s). |
| Power decision pilot | Pilot sent at a power level and/or a beam direction to be used by an interfering base station or an interfering terminal on the specified resource(s). |
| Resource quality indicator | Indicate channel quality of the specified resource(s). |

The messages in Table 1 may also be referred to by other names. For example, the interference mitigation trigger message may also be referred to as a pre forward link assignment block (pre-FLAB), the transmit capability request message may also be referred to as a pre reverse link assignment block (pre-RLAB), the FL resource grant may also be referred to as a forward link assignment block (FLAB), the RL resource grant may also be referred to as a reverse link assignment block (RLAB), and the reduce interference request message may also be referred to as a resource utilization message (RUM). Different and/or additional messages may also be used for short-term interference mitigation. The information carried by the messages in Table 1 may also be conveyed in other manners. For example, the transmit power level to be used on a resource may be sent in a message instead of conveyed in a pilot. For clarity, much of the description below assumes the use of the messages shown in Table 1.

Short-term interference mitigation may be achieved through use of reduce interference request messages. These messages may be sent by terminals to contend for resources on the forward link and may also be sent by base stations to contend for resources on the reverse link. These messages may enable orthogonalization of data transmissions across neighboring cells on a short-term basis.

In general, a resource may cover any frequency and/or time dimension and may be conveyed in any manner. In one design, a resource may cover a variable frequency dimension and may be identified by a channel ID for a node on a channel tree, e.g., as shown in FIG. 3. In another design, a resource may cover a fixed frequency dimension, e.g., a predetermined number of subcarriers. A resource may also cover a fixed or variable time duration. As some examples, a resource may cover a specific subband in a specific frame, a specific resource block, a specific time frequency block, etc.

Figure 4:
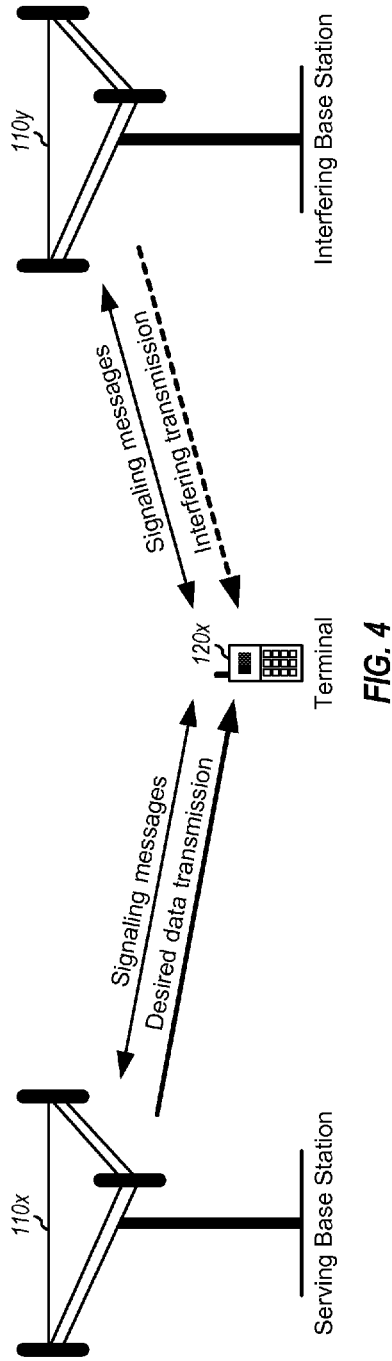
FIG. 4 shows data transmission on the forward link (FL).

FIG. 4 shows data transmission on the forward link in the presence of interference. A serving base station 110x may send a data transmission on the forward link to a terminal 120x. Terminal 120x may also receive an interfering transmission from an interfering base station 110y. This interfering transmission may be intended for another terminal not shown in FIG. 4. If the desired data transmission and the interfering transmission are sent on the same resource, then terminal 120x may not be able to decode the data transmission from serving base station 110x.

Terminal 120x may not be communicating with interfering base station 110y for data transmission. Nevertheless, terminal 120x may be able to reliably send messages to and receive messages from interfering base station 110y. In one design, messages such as those shown in Table 1 may be sent on resources allocated for these messages. These messages may then avoid interference due to other transmissions. In general, the messages used for short-term interference mitigation may be sent in any manner such that they can be reliably received by the recipient base stations/terminals, even when there are dominant interferers.

Figure 5:
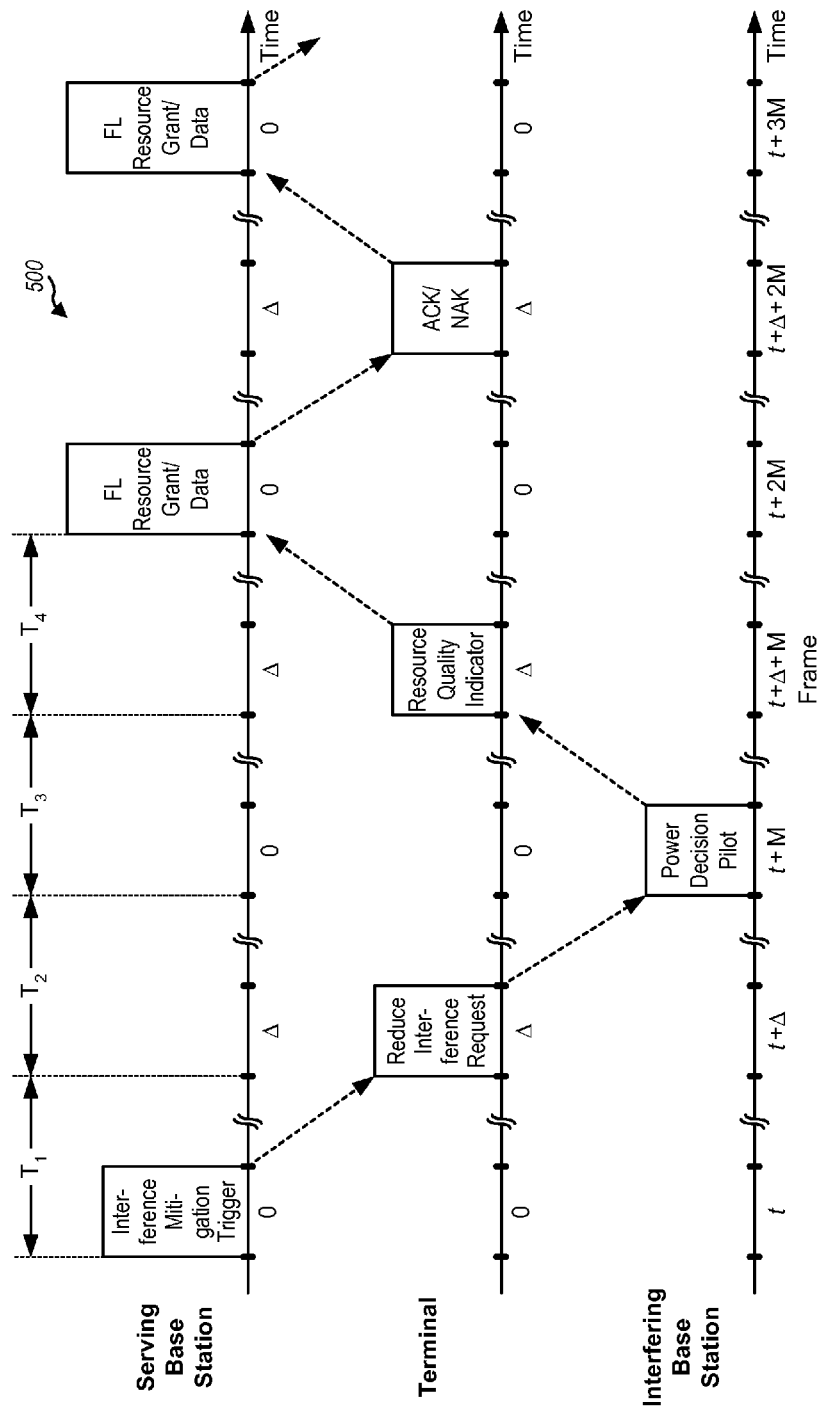
FIG. 5 shows FL data transmission with short-term interference mitigation.

FIG. 5 shows a timing diagram of a design of a scheme 500 for forward link data transmission with short-term interference mitigation. A serving base station may have data to send to a terminal and may have knowledge that the terminal is observing high interference on the forward link. The serving base station may receive pilot measurement reports from the terminal, and the reports may indicate and/or identify strong interfering base stations.

The serving base station may send an interference mitigation trigger message (or simply, a trigger message) to the terminal in frame t to trigger short-term interference mitigation. The trigger message may direct the terminal to ask interfering base stations to reduce interference on the forward link. The serving base station may also send the trigger message in order to obtain an accurate channel quality report from the terminal and may use this report to make a decision on short-term interference mitigation. In any case, the trigger message may identify one or more specific resources on which to reduce interference, a priority of the data to send, and/or other information. Each specified resource may be given by a channel ID for a channel tree, a subband index, a resource block index, etc.

The terminal may receive the trigger message from the serving base station and may send a reduce interference request message on the reverse link in frame t+Δ. In one design, the terminal may send the reduce interference request message only to base stations that are dominant interferers to the terminal on the forward link. The terminal may identify these dominant interfering base stations based on forward link pilots received from these base stations. In another design, the terminal may send the reduce interference request message to all neighbor base stations that can receive the message. In general, the reduce interference request message may be a unicast message sent to a specific base station, a multi-cast message sent to a set of base stations, or a broadcast message sent to all base stations. In any case, the reduce interference request message may ask the interfering base stations to reduce interference on one or more specified resources, e.g., to blank transmission on the specified resource(s), to reduce transmit power to an acceptable level, or to beamsteer in a direction different from the terminal. The reduce interference request message may include a priority metric indicating the urgency of the request, which may be used by the interfering base stations in making decisions on whether to grant or dismiss the request. The specified resource(s) and the priority metric sent in the reduce interference request message may be obtained directly from the interference mitigation trigger message or may be determined in other manners. The reduce interference request message may be sent Δ frames from when the trigger message was received, as shown in FIG. 5, where Δ may be a fixed offset between a forward link HARQ interlace and an associated reverse link HARQ interlace.

An interfering base station may receive the reduce interference request message from the terminal and may decide to reduce or blank transmission on the one or more specified resources. The interfering base station may determine a transmit power level that it will use on each specified resource based on its forward link buffer status, the reduce interference request messages received from other terminals for that specified resource, etc. For example, the interfering base station may determine whether to grant or dismiss the reduce interference request message based on the priority metric in the message, the forward link buffer status of the interfering base station, etc. The interfering base station may also determine the transmit power level that it will use for each specified resource based on the received powers and/or contents of the reduce interference request messages from all terminals. For example, the interfering base station may estimate the pathloss for each terminal based on the received power of the reduce interference request message from that terminal. The interfering base station may then determine the transmit power level that it will use based on the estimated pathloss for the terminal and target interference levels for the other terminals.

In one design, the interfering base station may convey the transmit power level that it will use for each specified resource via a power decision pilot sent at that transmit power level (or a related transmit power level) on a corresponding resource. The corresponding resource may cover the same frequency as the specified resource but may occur M frames earlier on the same forward link HARQ interlace. The interfering base station may send the power decision pilot on the corresponding resource in frame t+M, and the transmit power level for this pilot may be related to (e.g., equal to) the transmit power level that the interfering base station intend to use for the specified resource in frame t+2M. The transmit power level indicated via the power decision pilot may be a tentative transmit power decision. The interfering base station may use a higher or lower transmit power level on a specified resource based on quality of service (QoS), channel quality conditions, and/or other factors. Although not shown in FIG. 5, the serving base station may also receive reduce interference requests from other terminals observing high interference from this base station. The serving base station may also send a power decision pilot to these other terminals or may broadcast the power decision pilot to all terminals that can receive the pilot.

The terminal may receive power decision pilots from all interfering base stations and may estimate the channel quality for each specified resource based on the received pilots. The power decision pilots may allow the terminal to more accurately estimate the channel quality. The terminal may determine a resource quality indicator (RQI) value for each specified resource based on the estimated channel quality for that resource and estimated interference levels. For example, an RQI value for a given resource may be determined based on (i) the channel quality estimated based on the pilot from the serving base station and (ii) the interference estimated based on the pilots from the interfering base stations. The terminal may also determine a single RQI value for all specified resources. In any case, an RQI value may indicate an SNR value, a data rate, or some other information for the resource(s) covered by the RQI value. The terminal may send RQI information comprising one or more RQI values for the corresponding resource(s) in frame t+Δ+M. The RQI information may also be referred to as channel quality indicator (CQI) information.

The serving base station may receive the RQI information from the terminal and may schedule the terminal for data transmission on one or more assigned resources. Each assigned resource may correspond to all or a subset of a specified resource. The serving base station may select a modulation and coding scheme (MCS) based on the RQI information for the assigned resource(s). A MCS may also be referred to as a transport format, a packet format, a rate, etc. The serving base station may process data for the terminal in accordance with the MCS. The serving base station may generate an FL resource grant, which may include the assigned resource(s), the MCS, and/or other information. The serving base station may send the FL resource grant and a transmission of data to the terminal in frame t+2M.

The terminal may receive the FL resource grant from the serving base station and may obtain the assigned resource(s) and the MCS. The terminal may receive the transmission of data on the assigned resource(s), decode the received transmission in accordance with the MCS, and generate an ACK or a NAK based on the decoding result. The terminal may send the ACK or NAK to the serving base station in frame t+Δ+2M. The serving base station may send another transmission of the data in frame t+3M if a NAK is received and may either terminate or send a transmission of new data if an ACK is received.

FIG. 5 shows a specific design of short-term interference mitigation on the forward link. Short-term interference mitigation on the forward link may also be implemented with other designs.

The reduce interference request message may ask an interfering base station to reduce interference by reducing transmit power (as described above) and/or by beamsteering its power in a direction different from the terminal, e.g., by placing the terminal in a spatial null. Beamsteering may be performed based on spatial information, which may comprise precoding weights (e.g., a precoding matrix or vector), a channel estimate, and/or other information used by a transmitter to spatially steer its power. The spatial information may be obtained or provided in various manners. In one design, the reduce interference request message may include a terminal ID. A spatial channel between an interfering base station and the terminal may be known to the interfering base station, e.g., on a long-term basis. In another design, the message may be sent in a unicast manner to an interfering base station and may include information on the spatial channel or a preferred beam between that base station and the terminal. In yet another design, reciprocity between the forward and reverse links may be assumed, e.g., due to use of time division duplexing (TDD). An interfering base station may then estimate a reverse link channel for the terminal based on the message and may use the reverse link channel estimate as a forward link channel estimate. For all of the designs, an interfering base station may derive precoding weights based on information on the spatial channel or may be provided with the precoding weights. The interfering base station may then perform beamsteering with the precoding weights.

In the design shown in FIG. 5, the interfering base station may transmit a power decision pilot at the transmit power level that will be used on the specified resource(s). In another design, the interfering base station does not transmit a power decision pilot and does not sent a message in response to the reduce interference request message from the terminal. In this design, an assumption may be made that the interfering base station will not transmit on the specified resource(s), and the RQI may be determined assuming no interference from the interfering base station. In yet another design, the interfering base station does not transmit a power decision pilot or a message if it will not transmit on the specified resource(s) and transmits a power decision pilot or a message if it will transmit on the specified resource(s). In yet another design, the interfering base station may send a message containing the transmit power level that it will use on the specified resource(s). In yet another design, the interfering base station may provide spatial information in the power decision pilot. For example, the interfering base station may indicate a beam direction in addition to the transmit power level to be used on the specified resource(s) in a future frame. The interfering base station may achieve this by adjusting the transmit power for each transmit antenna at the base station. In yet another design, the interfering base station may send spatial information (e.g., precoding weights) separate from and in addition to the power decision pilot.

In one design, the interfering base station may reduce interference for one HARQ transmission, which may be for the first transmission of a packet. The same procedure may be repeated for each HARQ transmission to reduce interference. In another design, the interfering base station may reduce interference for L HARQ transmissions (e.g., on the same HARQ interlace), where L may be any integer value. For example, a packet may be processed (e.g., encoded and modulated) such that it can be reliably decoded after a target number of HARQ transmissions, and L may be equal to this target number. In yet another design, the interfering base station may reduce interference for multiple HARQ interlaces. The identities of these HARQ interlaces may be conveyed in the interference mitigation trigger message and/or the reduce interference request message. Alternatively, these HARQ interlaces may be known a priori by all base stations and terminals and would not need to be sent.

Figure 6:
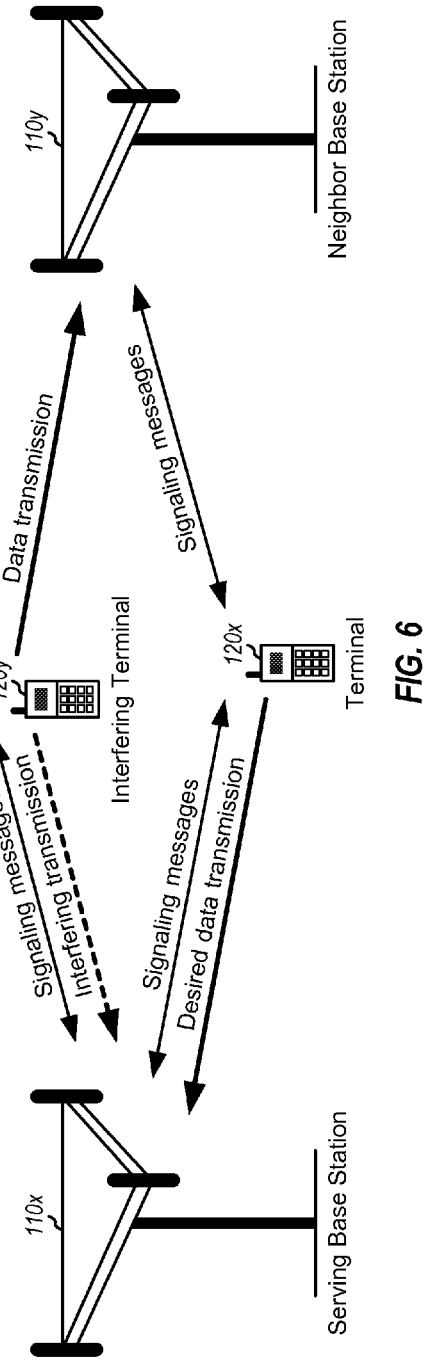
FIG. 6 shows data transmission on the reverse link (RL).

FIG. 6 shows data transmission on the reverse link in the presence of interference. Terminal 120x may send a data transmission on the reverse link to serving base station 110x. Serving base station 110x may also receive an interfering transmission from an interfering terminal 120y. This interfering transmission may be intended for neighbor base station 110y. If the desired data transmission and the interfering transmission are sent on the same resource, then serving base station 110x may not be able to decode the data transmission from terminal 120x. Terminal 120x may not be communicating with base station 110y for data transmission. Nevertheless, terminal 120x may be able to reliably send messages to and receive messages from base station 110y. Similarly, interfering terminal 120y may be able to reliably exchange messages with serving base station 110x.

Figure 7:
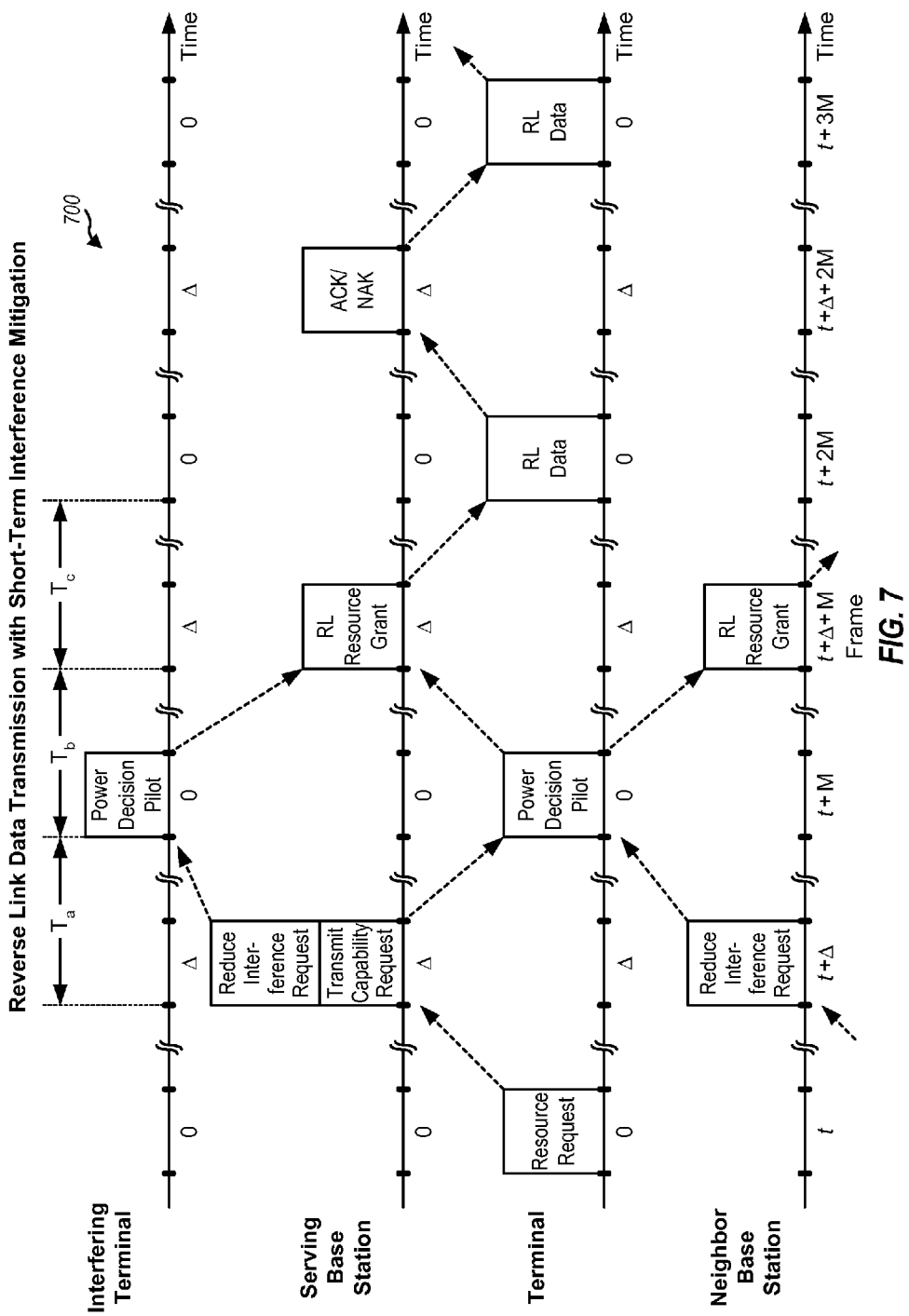
FIG. 7 shows RL data transmission with short-term interference mitigation.

FIG. 7 shows a timing diagram of a design of a scheme 700 for reverse link data transmission with short-term interference mitigation. A terminal may have data to send to a serving base station and may send a resource request in frame t. The resource request may include a buffer size at the terminal, an indication of the urgency of the resource request, etc. The resource request may be sent in any frame since it typically does not carry information on a specific resource. The serving base station may receive the resource request and may send a transmit capability request message to the terminal in frame t+Δ to ask for the transmit power capability of the terminal on a specific resource, e.g., to ask the terminal to transmit a power decision pilot on the specified resource. The transmit capability request message may include a priority metric for the request and/or other information. The serving base station may also send a reduce interference request message on the forward link in frame t+Δ to ask interfering terminals to reduce interference (e.g., to blank or lower their transmit powers to an acceptable level) on the specified resource. The reduce interference request message may include a priority metric indicating the urgency of the request, which may be used by the interfering terminals to make decisions on whether to grant or dismiss the request. The serving base station may send the transmit capability request message and the reduce interference request message in the same frame, as shown in FIG. 7, or in different frames.

The terminal may receive the transmit capability request message from the serving base station and may also receive reduce interference request messages from neighbor base stations. For simplicity, only one neighbor base station is shown in FIG. 7. The terminal may first determine whether or not to obey the reduce interference request message from each neighbor base station, e.g., based on the priority contained in the message. The terminal may then determine the maximum transmit power level that it can use on the specified resource based on the reduce interference request messages that the terminal will obey. The reduce interference request message from each neighbor base station may indicate the amount of interference that base station can tolerate and may be sent at a known transmit power level, which may be provided in the message or known a priori by the terminal. The terminal may estimate the pathloss for each neighbor base station based on the known transmit power level and the received power level of the reduce interference request message from that base station. The terminal may assume equal pathloss for the forward and reverse links and may determine the maximum transmit power level that the terminal can use in order to meet the interference requirement of each neighbor base station. The terminal may convey this maximum transmit power level via a power decision pilot that is sent at this transmit power level (or a scaled transmit power level) on a corresponding resource. The corresponding resource may cover the same frequency as the specified resource but may occur M frames earlier on the same reverse link HARQ interlace. The terminal may send the power decision pilot on the corresponding resource in frame t+M, and the transmit power level for this pilot may be the maximum transmit power level that the terminal can use for the specified resource in frame t+2M. The transmit capability request message from the serving base station in frame t+Δ may also carry a suggested transmit power level for the power decision pilot. In this case, the terminal may adjust the suggested transmit power level based on the reduce interference request messages received from the neighbor base stations.

The serving base station may receive the power decision pilots from the terminal as well as the interfering terminals and may estimate the channel quality of the specified resource based on the received pilots. The power decision pilots may allow the serving base station to more accurately estimate the channel quality and interference. For example, the serving base station may estimate the channel quality based on the pilot from the terminal, estimate interference based on the pilots from the interfering terminals, and determine an MCS for the terminal based on the channel equality estimate and the interference estimate. The serving base station may schedule the terminal for data transmission on the specified resource in accordance with the MCS. The serving base station may generate an RL resource grant, which may include the assigned resource, the MCS, an assigned transmit power level to use for the assigned resource, and/or other information. The assigned transmit power level may override the transmit power level indicated via the power decision pilot. The serving base station may send the RL, resource grant to the terminal in frame t+Δ+M. The terminal may receive the RL resource grant from the serving base station and may obtain the assigned resource, the MCS, etc. The terminal may send a transmission of data on the assigned resource in frame t+2M.

The serving base station may receive the transmission of data from the terminal, decode the received transmission, and generate an ACK or a NAK based on the decoding result. The serving base station may send the ACK or NAK to the terminal in frame t+Δ+2M. The terminal may send another transmission of the data in frame t+3M if a NAK is received and may either terminate or send a transmission of new data if an ACK is received.

FIG. 7 shows a specific design of short-term interference mitigation on the reverse link. Short-term interference mitigation on the reverse link may also be implemented with other designs.

In the design shown in FIG. 7, the terminal may transmit a power decision pilot at the maximum transmit power level that it can use on the specified resource. In another design, the terminal may send a message containing the maximum transmit power level that it can use on the specified resource.

In one design, the interfering terminals may reduce interference for one HARQ transmission, which may be for the first transmission of a packet. The same procedure may be repeated for each HARQ transmission to reduce interference. In another design, the interfering terminals may reduce interference for L HARQ transmissions, e.g., on the same HARQ interlace, where L may be any integer value. In yet another design, the interfering terminals may reduce interference for multiple HARQ interlaces.

Figure 8:
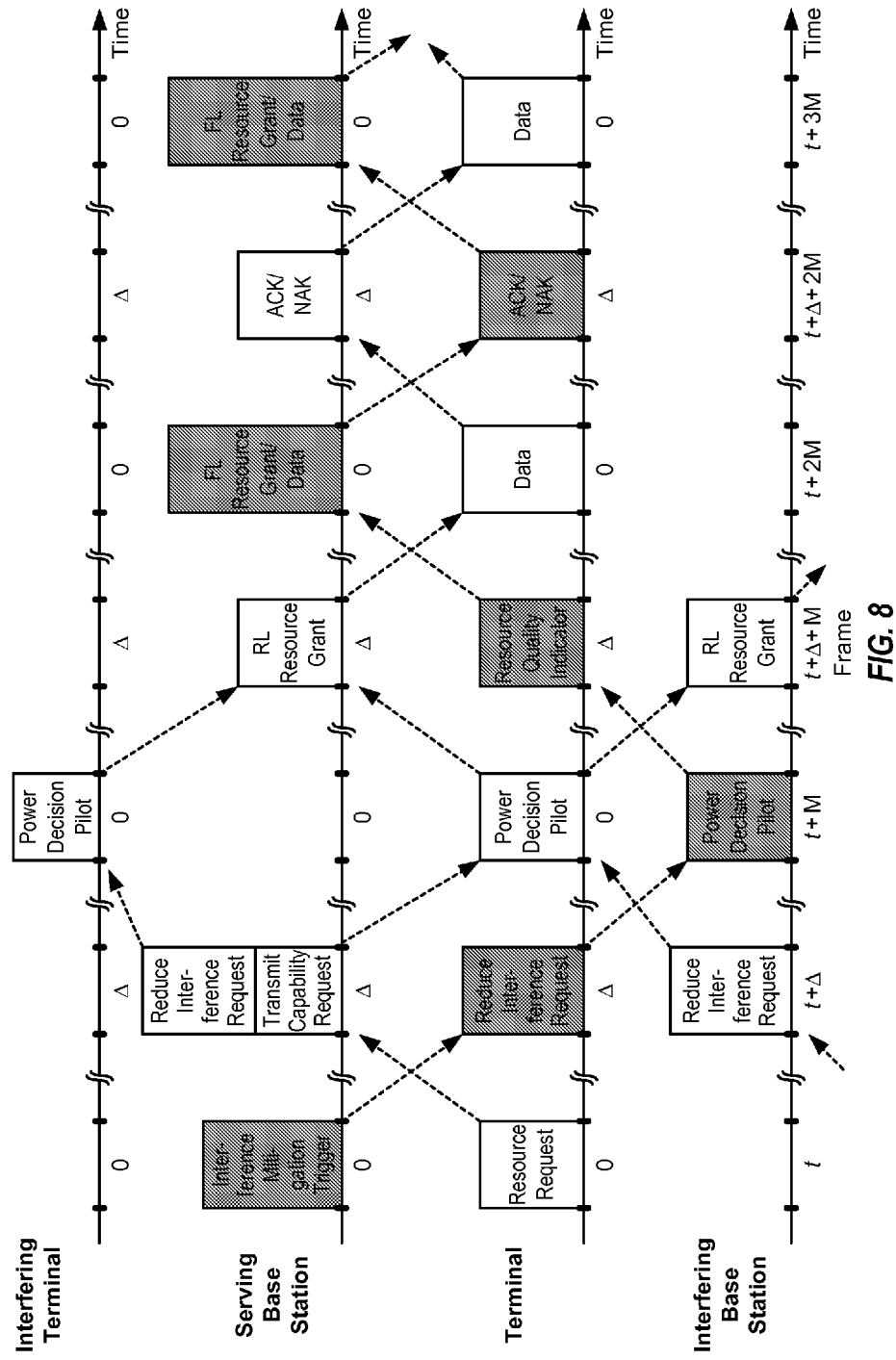
FIG. 8 shows multiplexing of FL data transmission and RL data transmission with short-term interference mitigation.

FIG. 8 shows a design of a scheme 800 for multiplexing forward link data transmission and reverse link data transmission with short-term interference mitigation. FIG. 8 may be obtained by superimposing FIGS. 5 and 7. For clarity, all of the transmissions for sending data on the forward link are shown with gray shading. As shown in FIG. 8, data transmissions on the forward and reverse links may be efficiently multiplexed.

A power decision pilot may be used by a base station to advertise in a given frame t the transmit power that the base station plans to use in a future frame t+M. If all base stations carry out this operation, then a terminal can accurately estimate the channel quality that the terminal can expect in future frame t+M. The channel quality may be given by a signal-to-noise ratio (SNR), a signal-to-noise-and-interference ratio (SINR), a carrier-to-interference ratio (C/I), etc. The terminal may determine CQI information based on a function of the estimated SNR and may report the CQI information to its serving base station. An accurate SNR estimate obtained from the power decision pilot may allow the serving base station to carry out accurate rate prediction.

A power decision pilot may be particularly useful in a heterogeneous system observing high interference conditions, since the SNR observed by a terminal may vary drastically from frame to frame. However, the power decision pilot also introduces latency, since a base station may have to determine in advance the transmit power that it will use in the future. Thus, if data suddenly shows up in a buffer at the base station, the base station may not be able to immediately schedule this data without first advertising its transmit power for a future frame. A similar latency may occur on the uplink. The terminal may first advertise its transmit power in a given frame prior to transmitting data in a future frame.

In an aspect, a power decision pilot may be selectively transmitted when it might sufficiently improve channel estimation and may be omitted otherwise in order to reduce latency. A decision on whether or not to transmit the power decision pilot may be made in various manners.

In one design, a static decision may be made on whether or not to transmit a power decision pilot. For example, the power decision pilot may be transmitted in a heterogeneous system and not transmitted in a homogeneous system. A static decision may also be made based on other factors.

In another design, a semi-static decision may be made on whether or not to transmit a power decision pilot. For example, the power decision pilot may be transmitted on a given link when a dominant interferer is present on that link and may be omitted otherwise. A dominant interferer may be a station transmitting the power decision pilot or another station. On the downlink, a dominant interfering base station may be determined based on pilot measurement reports from the terminals. For example, if a pilot measurement report from a terminal indicates strong received power for a non-serving base station, then this base station may be deemed as a dominant interferer to the terminal on the downlink. A given base station may transmit a power decision pilot on the downlink if (i) any terminal not served by the base station (i.e., any non-served terminal) observes high interference from the base station, which is a dominant interferer, and/or (ii) any terminal served by the base station observes high interference from another base station acting as a dominant interferer on the downlink. The base station may skip transmitting the power decision pilot on the downlink otherwise.

On the uplink, a dominant interfering terminal may be determined based on its received power at the base stations. The received power of the terminal may, in turn, be ascertained based on the downlink received powers of the serving and non-serving base stations at the terminal (or a ratio of their received powers, which may be referred to as ChanDiff). For example, the serving base station may measure the received power of the terminal and may translate that to the received power of the terminal at a non-served base station based on the ChanDiff. Thus, the serving base station can use the pilot measurement reports sent by the terminal to determine whether the terminal is a dominant interferer to another base station. In another design, the terminal may be assumed to be a dominant interferer on the uplink if it observes a dominant interferer on the downlink, which may in turn be determined based on pilot measurement reports from the terminal. In any case, a given terminal may transmit a power decision pilot on the uplink if (i) the terminal is a dominant interferer causing high interference to a non-serving base station on the uplink and/or (ii) its serving base station observes a dominant interferer on the uplink. The terminal may skip transmitting the power decision pilot on the uplink otherwise. Dominant interferers on the downlink and uplink may be determined on a long timescale, and a power decision pilot may be transmitted or not transmitted based on this determination.

In yet another design, a dynamic decision may be made on whether or not to transmit a power decision pilot. On the downlink, a base station may transmit a power decision pilot only if it has received a reduce interference request from a non-served terminal in a neighbor cell. Reception of the reduce interference request may indicate that the non-served terminal is observing high interference from the base station and desiring to be scheduled in the same frame. On the uplink, a terminal may transmit a power decision pilot only if it has received a reduce interference request from a neighbor base station. The terminal may periodically report the number of reduce interference requests received by the terminal to its serving base station. The serving base station may decide whether or not to wait for a power decision pilot from the terminal before sending a resource grant. The serving base station may also configure the terminal (or request the terminal each time a resource request is received) to not send the power decision pilot. A base station or a terminal may also transmit a power decision pilot only if a reduce interference request is granted and may skip transmitting the power decision pilot if the request is dismissed. A decision on whether to grant or dismiss the reduce interference request may be made based on a priority metric in the request, buffer status of the base station or the terminal, etc. A terminal may also transmit a power decision pilot if a non-serving base station has observed significant SNR variations from the terminal in the past. Similarly, a base station may transmit a power decision pilot if a non-served terminal observes significant SNR variations from the base station in the past. A dynamic decision on whether or not to transmit a power decision pilot may also be made in other manners.

The designs described above may ensure that the latency cost of a power decision pilot is incurred only when there is sufficient benefit associated with the transmission of the power decision pilot. Furthermore, not transmitting the power decision pilot can save overhead in the static and semi-static cases. It may also be possible to save overhead in the dynamic case if the base station can reuse the resources normally used for the power decision pilot for data transmission.

FIGS. 5 and 7 show designs in which the forward link transmissions from the serving base station and the interfering base station are on one forward link HARQ interlace, and the reverse link transmissions from the terminal are on one reverse link HARQ interlace. These designs may simplify operation of short-term interference mitigation and may provide other advantages, as described below.

For the forward link short-term interference mitigation scheme shown in FIG. 5, an interference mitigation trigger message may cause a reduce interference request message to be sent $T_1$ frames later, which may cause a power decision pilot to be sent $T_2$ frames later, which may cause RQI information to be sent $T_3$ frames later, which may cause a transmission of data to be sent $T_4$ frames later, where $T_1$, $T_2$, $T_3$ and $T_4$ may each be any suitable value. The forward link transmissions may be sent on one HARQ interlace if $T_1+T_2=T_3+T_4=M$, as shown in FIG. 5. The reverse link transmissions may be sent on one HARQ interlace if $T_2+T_3=M$, as also shown in FIG. 5.

For the reverse link short-term interference mitigation scheme shown in FIG. 7, a transmit capability request message may cause a power decision pilot to be sent $T_a$ frames later, which may cause an RL resource grant to be sent $T_b$ frames later, which may cause a transmission of data to be sent $T_c$ frames later, where $T_a$, $T_b$ and $T_c$ may each be any suitable value. The forward link transmissions may be sent on one HARQ interlace if $T_a+T_b=M$, as shown in FIG. 7. The reverse link transmissions may be sent on one HARQ interlace if $T_b+T_c=M$, as also shown in FIG. 7.

In another design, interference mitigation trigger messages and reduce interference request messages for all HARQ interlaces may be sent in a single HARQ interlace. A bitmap may cover different frames for different HARQ interlaces and may indicate which messages are applicable for which HARQ interlaces.

In one design, the messages used for forward link short-term interference mitigation may be sent in frames that are separated by predetermined spacing, e.g., as shown in FIG. 5. Similarly, the messages used for reverse link short-term interference mitigation may be sent in frames that are separated by predetermined spacing, e.g., as shown in FIG. 7. This design can implicitly provide time information, which may simplify operation and reduce overhead. In another design, time information may be explicitly provided in messages. For example, a given message may request a response to be sent a specified number of frames later or may specify a resource in a particular number of frames later. This design may provide more flexibility.

The forward link short-term interference mitigation scheme in FIG. 5 may differ from the reverse link short-term interference mitigation scheme in FIG. 7 in several respects. For the forward link, the serving base station may send an interference mitigation trigger message to direct the terminal to send a reduce interference request message on the reverse link. For the reverse link, the serving base station may send a transmit capability request message to direct the terminal to send a power decision pilot on the reverse link.

The messages and pilot shown in Table 1 and FIGS. 5 and 7 may be sent in various manners and on various channels. Table 2 lists some channels that may be used for the messages and pilot in accordance with one design.

TABLE 2

| Message/Pilot | Send on . . . | Description |
|---|---|---|
| Interference mitigation trigger | Forward link | Send on forward shared control channel (F-SCCH) or physical downlink control channel (PDCCH). |
| Transmit capability request | Forward link | Send on F-SCCH or PDCCH. |
| FL resource grant | Forward link | Send on F-SCCH or PDCCH. |
| RL resource grant | Forward link | Send on F-SCCH or PDCCH. |
| Reduce interference request | Forward link or reverse link | Send on forward link RUM channel (F-RUM) or PDCCH for forward link. Send on reverse link RUM channel (R-RUM) or physical uplink control channel (PUCCH) for reverse link. |
| Power decision pilot | Forward link or reverse link | Send on forward link power decision pilot channel (F-PDPICH) for forward link. Send on reverse link power decision pilot channel (R-PDPICH) for reverse link. |
| RQI | Reverse link | Send on RQI channel (R-RQICH) or PUCCH. |

The messages and pilot shown in Table 1 and FIGS. 5 and 7 may also be sent in other manners. In another design, the serving base station may send an interference mitigation trigger message or a transmit capability request message with forward link data to the terminal. In yet another design, the serving base station may send the interference mitigation trigger message and/or the reduce interference request message to neighbor base stations via the backhaul.

As noted above, the messages used for short-term interference mitigation may be sent such that they can be reliably received by the recipient stations. In one design, a reduce interference request message may be sent on the reverse link on a first segment that may be cleared of other reverse link transmissions. Similarly, a reduce interference request message may be sent on the forward link on a second segment that may be cleared of other forward link transmissions. This design may ensure that the reduce interference request messages can be reliably sent on the forward and reverse links. In general, the messages may be sent on control channels that may be orthogonalized with respect to the dominant interferers. The orthogonalization may be achieved by using resources (e.g., a set of subcarriers, a set of frames, etc.) that are not used by the dominant interferers.

In one design, the messages used for short-term interference mitigation may be sent on a single HARQ interlace on the forward link and on a single corresponding HARQ interlace on the reverse link. This design may allow for efficient resource partitioning between different base stations (e.g., of different power classes) as well as between an access link and a backhaul link of relay stations. For this design, resource partitioning may be achieved with a granularity of one HARQ interlace on each link, since the same HARQ interlace will also provide control transmission for the other link. For this design, if cooperation is needed from an interfering base station or an interfering terminal in order to enable reliable message reception, then this cooperation may be granted in units of HARQ interlaces. Such cooperation may take the form of control blanking or HARQ interlace partitioning. Confining the messages to a single HARQ interlace on each link may also support forwarding of the messages via relay stations. For example, a relay station may receive a reduce interference request message from the terminal and may forward the message upstream to the interfering base station or another relay station. The relay station may also receive a reduce interference request message from a base station and may forward the message downstream to the terminal or another relay station. The upstream/downstream partitioning may be carried out in units of HARQ interlaces. For example, the terminal may send a reduce interference request message on HARQ interlace a, and the relay station may forward the message on HARQ interlace b, where a≠b.

For both the forward and reverse links, the base stations may make pre-scheduling decisions in advance of actual scheduling, e.g., make a pre-scheduling decision when the interference mitigation trigger message is generated in FIG. 5 or when the transmit capability request message and the reduce interference request message are generated in FIG. 7. The actual scheduling decisions may or may not be the same as the pre-scheduling decisions depending on various factors. For example, if the estimated channel quality for a specified resource is poor, then the resource may not be assigned to the terminal.

On the forward link, the serving base station may send the interference mitigation trigger message for a specified resource to one terminal and may use this resource for this terminal, as described above. The serving base station may also use this resource for another terminal, e.g., if the scheduling decisions have changed after sending the interference mitigation trigger message. In this case, the serving base station may select the MCS for the other terminal using no RQI information or the most recent RQI information available for that terminal.

On the forward link, the serving base station may schedule terminals that do not observe high interference from neighbor base stations without sending interference mitigation trigger messages. On the reverse link, the serving base station may schedule terminals that are not strong interferers to neighbor base stations without sending transmit capability request messages. The serving base station may make these decisions based on pilot measurement reports from the terminals. Scheduling these terminals without using short-term interference mitigation whenever possible may allow for more efficient resource utilization.

In one design, overhead of messages for short-term interference mitigation may be reduced by subsampling. A scheduling period of S frames for each HARQ interlace may be used, where S may be determined by the desired amount of subsampling and may be any suitable integer value. A reduce interference request message may be sent once every S frames on a given HARQ interlace, and a scheduling decision may be valid for S frames on this HARQ interlace. The scheduling periods for different HARQ interlaces may be staggered in time in order to reduce initial latency caused by the subsampling.

In one design, an interference mitigation trigger message, a transmit capability request message, and/or a reduce interference request message may contain a persistence bit. This bit may be set to a first value (e.g., '0') to indicate that the message is valid for a nominal period of time (e.g., one frame) or to a second value (e.g., '1') to indicate that the message is valid for an extended period of time (e.g., a predetermined number of frames).

The short-term interference mitigation techniques described herein may be used for various deployment scenarios. The techniques may be used for a system in which all base stations are for macro cells. The techniques may be invoked for cell-edge terminals that may observe high interference from neighbor base stations on the forward link and/or may cause high interference to the neighbor base stations on the reverse link.

The techniques may also be used for a system supporting base stations transmitting at different power levels, e.g., for macro cells, pico cells, and femto cells. Some base stations may also be deployed in an unplanned manner, i.e., without any network planning. In addition, a base station may support restricted association and may not allow all terminals to connect to the base station. The restricted association may be useful, e.g., for a base station installed inside a home, where only users living in the home may be allowed to connect to the base station.

The techniques described herein may be advantageously used for dominant interference scenarios, which may be unavoidable or desirable. For example, a terminal may not be allowed to connect to a base station with the strongest received power, e.g., due to the base station allowing restricted association. This base station may then be the dominant interferer. As another example, the terminal may want to connect to a base station with lower received power if that base station has a lower pathloss. This may be the case, e.g., if the base station has a significantly lower transmit power level (e.g., for a pico cell or a femto cell) than that of other base stations and may thus cause less interference to the system to achieve a similar data rate, which is desirable. Other base stations with higher received power at the terminal would then be the dominant interferers. On the reverse link, transmissions sent to the base station with lower pathloss may cause lower interference in the system, which is desirable.

FIG. 9 shows a design of a process 900 for sending a power decision pilot. Process 900 may be performed by a first station, which may be a base station or a terminal. Process 900 may be used for transmission scheme 500 in FIG. 5 as well as transmission scheme 700 in FIG. 7.

The first station may receive a message sent by a second station to request reduction of interference on at least one resource (block 912). The first station may determine a first transmit power level to use for the at least one resource in response to receiving the message (block 914). The first station may determine the first transmit power level based on one or more factors such as a priority metric sent in the message, the buffer size at the first station, etc. For example, the first station may grant or dismiss the message (or determine whether or not to reduce its transmit power) based on the priority metric. In one design, the first station may estimate the pathloss for the second station based on the received power of the message. The first station may then determine the first transmit power level based on a target interference level, the estimated pathloss for the second station, the buffer size at the first station, etc.

The first station may send a pilot at a second transmit power level determined based on the first transmit power level (block 916). The first station may set the second transmit power level (i) equal to the first transmit power level or (ii) equal to a scaled version of the first transmit power level, e.g., a fixed number of decibels (dB) offset from the first transmit power level. The first station may send the pilot on the at least one resource in a first time period and may use the first transmit power level for the at least one resource in a second time period later than the first time period. The first and second time periods may correspond to different frames in the same HARQ interlace.

The first station may have multiple transmit antennas and may send the pilot from each transmit antenna at a transmit power level selected for that transmit antenna. The transmit power levels for the multiple transmit antennas may be selected to steer power in a direction different from the second station. For example, precoding weights for the multiple transmit antennas may be determined to reduce interference to the second station and may be used for the at least one resource. In one design, the pilot may be sent from the multiple transmit antennas in accordance with the precoding weights. In another design, the pilot may be sent from the multiple transmit antennas at the same transmit power level, and the precoding weights may be sent to the second station.

FIG. 10 shows a design of an apparatus 1000 for sending a power decision pilot. Apparatus 1000 includes a module 1012 to receive at a first station a message sent by a second station to request reduction of interference on at least one resource, a module 1014 to determine a first transmit power level to use for the at least one resource by the first station in response to receiving the message, and a module 1016 to send a pilot from the first station at a second transmit power level determined based on the first transmit power level.

FIG. 11 shows a design of a process 1100 for sending a power decision pilot by a terminal. Process 1100 may be used for transmission scheme 700 in FIG. 7. The terminal may receive from a serving base station a message requesting transmit capability of the terminal for at least one resource (block 1112). The terminal may also receive at least one message from at least one neighbor base station requesting reduction of interference on the at least one resource (block 1114). The terminal may determine a maximum transmit power level usable for the at least one resource based on the at least one message (block 1116). The terminal may send a pilot at the maximum transmit power level usable for the at least one resource (block 1118). The terminal may send the pilot on the at least one resource in a first time period and may use up to the maximum transmit power level for the at least one resource in a second time period later than the first time period. The first and second time periods may correspond to different frames in the same HARQ interlace.

In one design of block 1116, the terminal may estimate pathloss for each neighbor base station based on the received power of a message received from that neighbor base station. The terminal may then determine the maximum transmit power level based on a target interference level and the estimated pathloss for each neighbor base station.

In one design of block 1118, the terminal may determine precoding weights for multiple transmit antennas to reduce interference to a neighbor base station. The terminal may send the pilot in accordance with the precoding weights. Alternatively, the terminal may send the pilot from the multiple transmit antennas at the same transmit power level and may send the precoding weights to the neighbor base station.

FIG. 12 shows a design of an apparatus 1200 for sending a power decision pilot by a terminal. Apparatus 1200 includes a module 1212 to receive a message requesting transmit capability of a terminal for at least one resource, a module 1214 to receive at least one message from at least one neighbor base station requesting reduction of interference on the at least one resource, a module 1216 to determine a maximum transmit power level usable by the terminal for the at least one resource based on the at least one message, and a module 1218 to send a pilot at the maximum transmit power level usable by the terminal for the at least one resource.

FIG. 13 shows a design of a process 1300 for advertising transmit power in advance. Process 1300 may be performed by a station, which may be a base station or a terminal. The station may determine a first transmit power level to use for data transmission in a first time period (block 1312). The station may determine a second transmit power level to use for pilot based on the first transmit power level (block 1314). The station may set the second transmit power level equal to the first transmit power level or a scaled version of the first transmit power level. The station may send the pilot at the second transmit power level in a second time period earlier than the first time period (block 1316).

In one design, the station may receive a message requesting reduction of interference on at least one resource in the first time interval. The station may send the pilot on the at least one resource in the second time interval in response to receiving the message. In one design, the station may have multiple transmit antennas and may determine precoding weights for the multiple transmit antennas to steer the pilot and the data transmission. The station may send the pilot from the multiple transmit antennas in accordance with the precoding weights. Alternatively, the station may send the pilot from the multiple transmit antennas at the same transmit power level and may send the precoding weights to a transmitter of the message.

FIG. 14 shows a design of an apparatus 1400 for advertising transmit power in advance. Apparatus 1400 includes a module 1412 to determine a first transmit power level to use for data transmission in a first time period, a module 1414 to determine a second transmit power level to use for pilot based on the first transmit power level, and a module 1416 to send the pilot at the second transmit power level in a second time period earlier than the first time period.

FIG. 15 shows a design of a process 1500 for receiving power decision pilot. Process 1500 may be performed by a first station, which may be a base station or a terminal. Process 1500 may be used for transmission scheme 500 in FIG. 5 as well as transmission scheme 700 in FIG. 7.

The first station may receive at least one pilot from at least one interfering station, with each pilot being sent at a transmit power level to be used on at least one resource by a corresponding interfering station (block 1512). The first station may also receive a pilot from a second station intending to send data to the first station (block 1514). The first station may estimate channel quality of the at least one resource having reduced interference from the at least one interfering station, e.g., based on the at least one pilot from the at least one interfering station and the pilot from the second station (block 1516). The first station may thereafter receive a data transmission on the at least one resource from the second station (block 1518).

In one design of data transmission on the forward link, the first station may be a terminal and the second station may be a serving base station. The terminal may send RQI information indicative of the estimated channel quality of the at least one resource to the serving base station. The serving base station may send the data transmission using the RQI information. In one design of data transmission on the reverse link, the first station may be a serving base station and the second station may be a terminal. The serving base station may select a modulation and coding scheme based on the estimated channel quality of the at least one resource and may send a resource grant comprising the selected modulation and coding scheme to the terminal. The terminal may send the data transmission in accordance with the resource grant to the serving base station.

FIG. 16 shows a design of an apparatus 1600 for receiving power decision pilot. Apparatus 1600 includes a module 1612 to receive at a first station at least one pilot from at least one interfering station, with each pilot being sent at a transmit power level to be used on at least one resource by a corresponding interfering station, a module 1614 to receive a pilot from a second station intending to send data to the first station, a module 1616 to estimate channel quality of the at least one resource having reduced interference from the at least one interfering station, and a module 1618 to receive a data transmission on the at least one resource from the second station.

Figures 17, 18:
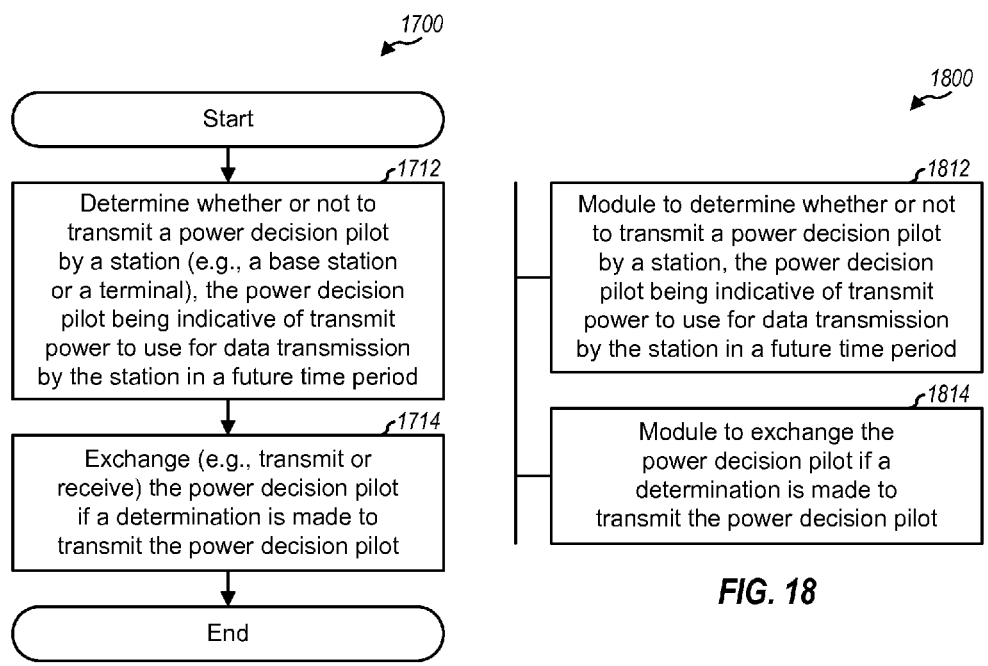
FIGS. 17 and 18 show a process and an apparatus, respectively, for selective transmission of a power decision pilot.

FIG. 17 shows a design of a process 1700 for selective transmission of a power decision pilot. Whether or not to transmit a power decision pilot by a station (e.g., a base station or a terminal) may be determined (block 1712). The power decision pilot may be indicative of transmit power to use for data transmission by the station in a future time period. The power decision pilot may be exchanged (e.g., transmitted or received) if a determination is made to transmit the power decision pilot and may be omitted otherwise (block 1714).

In one design of block 1712, a static decision may be made to either transmit or not transmit the power decision pilot. For example, the power decision pilot may be transmitted for a heterogeneous system and not transmitted for a homogeneous system. In another design, a semi-static decision or a dynamic decision may be made to transmit or not transmit the power decision pilot.

In one design, the station may be a base station, and the power decision pilot may be transmitted on the downlink. The power decision pilot may be transmitted if (i) the base station causes high interference to a terminal not served by the base station, which may be determined based on a pilot measurement report from the terminal, or (ii) a terminal served by the base station observes high interference from a neighbor base station. The power decision pilot may also be transmitted if (i) the base station receives a reduce interference request from a terminal not served by the base station, (ii) the base station grants the reduce interference request, or (iii) some other criterion is satisfied.

In another design, the station may be a terminal, and the power decision pilot may be transmitted on the uplink. The power decision pilot may be transmitted if (i) the terminal causes high interference to a neighbor base station, or (ii) the serving base station observes high interference from another terminal not served by the base station. The power decision pilot may also be transmitted if (i) the terminal receives a reduce interference request from the neighbor base station, (ii) the terminal receives a command from the serving base station to transmit the power decision pilot, or (iii) some other criterion is satisfied.

In one design, process 1700 may be performed by a serving base station for transmission of the power decision pilot on the downlink. The serving base station may determine whether or not to transmit the power decision pilot in block 1712 and may transmit the power decision pilot in block 1714 if a determination is made to transmit the pilot. In another design, process 1700 may be performed by the serving base station for transmission of the power decision pilot by a terminal on the uplink. The serving base station may determine whether the terminal should transmit the power decision pilot in block 1712, may send a command to the terminal, and may receive the power decision pilot from the terminal in block 1714. In another design, process 1700 may be performed by the terminal for transmission of the power decision pilot on the uplink. The terminal may determine whether to transmit the power decision pilot in block 1712 and may transmit the power decision pilot in block 1714 if a determination is made to transmit the pilot. Process 1700 may also be performed by other entities.

FIG. 18 shows a design of an apparatus 1800 for selective transmission of a power decision pilot. Apparatus 1800 includes a module 1812 to determine whether or not to transmit a power decision pilot by a station (e.g., a base station or a terminal), the power decision pilot being indicative of transmit power to use for data transmission by the station in a future time period, and a module 1814 to exchange (e.g., transmit or receive) the power decision pilot if a determination is made to transmit the power decision pilot.

The modules in FIGS. 10, 12, 14, 16 and 18 may comprise processors, electronics devices, hardware devices, electronics components, logical circuits, memories, etc., or any combination thereof.

Figure 19:
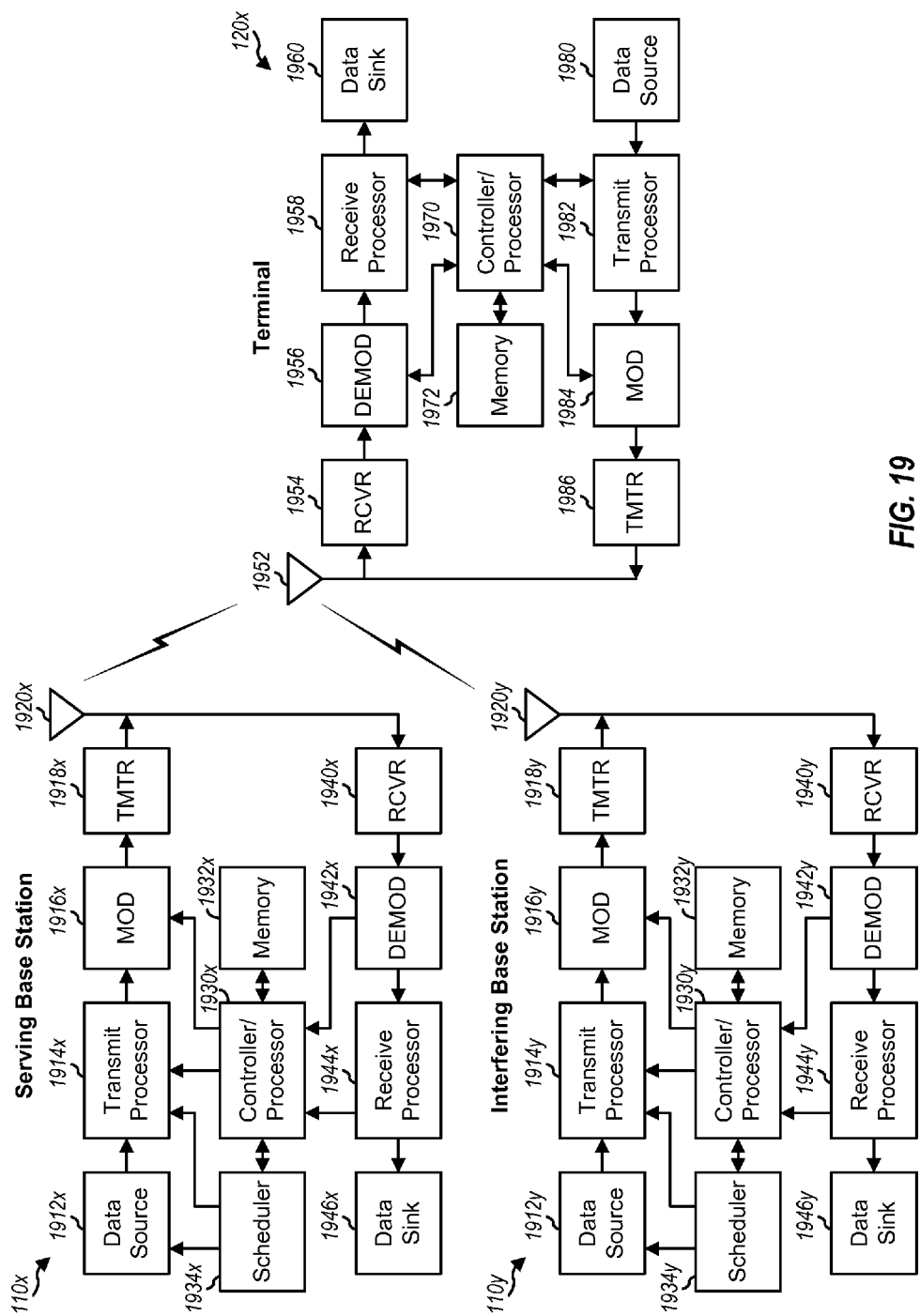
FIG. 19 shows a block diagram of a terminal and two base stations.

FIG. 19 shows a block diagram of a design of serving base station 110x, interfering base station 110y, and terminal 120x in FIGS. 4 and 6. At serving base station 110x, a transmit processor 1914x may receive traffic data from a data source 1912x and messages from a controller/processor 1930x and a scheduler 1934x. For example, controller/processor 1930x may provide messages for short-term interference mitigation shown in FIGS. 5 and 7. Scheduler 1934x may provide resource grants for terminal 120x. Transmit processor 1914x may process (e.g., encode, interleave, and symbol map) the traffic data, messages, and pilot and provide data symbols, control symbols, and pilot symbols, respectively. A modulator (MOD) 1916x may perform modulation on the data, control, and pilot symbols (e.g., for OFDM, CDMA, etc.) and provide output samples. A transmitter (TMTR) 1918x may conditions (e.g., convert to analog, amplify, filter, and upconvert) the output samples and generate a forward link signal, which may be transmitted via an antenna 1920x.

Interfering base station 110y may similarly process traffic data and messages for the terminals served by base station 110y and interfering terminals. The traffic data, messages, and pilot may be processed by a transmit processor 1914y, modulated by a modulator 1916y, conditioned by a transmitter 1918y, and transmitted via an antenna 1920y.

At terminal 120x, an antenna 1952 may receive the forward link signals from base stations 110x and 110y and possibly other base stations. A receiver (RCVR) 1954 may condition (e.g., filter, amplify, downconvert, and digitize) a received signal from antenna 1952 and provide samples. A demodulator (DEMOD) 1956 may perform demodulation on the samples and provide detected symbols. A receive processor 1958 may process (e.g., symbol demap, deinterleave, and decode) the detected symbols, provide decoded traffic data to a data sink 1960, and provide decoded messages (e.g., for resource grants and short-term interference mitigation) to a controller/processor 1970. Demodulator 1956 may estimate the channel quality of specified resources and may provide the estimated channel quality to controller/processor 1970.

On the reverse link, a transmit processor 1982 may receive and process traffic data from a data source 1980 and messages (e.g., for resource requests and short-term interference mitigation) from controller/processor 1970 and provide data and control symbols. A modulator 1984 may perform modulation on the data, control, and pilot symbols and may provide output samples. A transmitter 1986 may condition the output samples and generate a reverse link signal, which may be transmitted via antenna 1952.

At each base station, the reverse link signals from terminal 120x and other terminals may be received by antenna 1920, conditioned by a receiver 1940, demodulated by a demodulator 1942, and processed by a receive processor 1944. Processor 1944 may provide decoded traffic data to a data sink 1946 and decoded messages to controller/processor 1930. Demodulator 1942 may estimate the channel quality of one or more resources for terminal 120x and may provide this information to controller/processor 1930. Controller/processor 1930 may select MCS and/or other parameters for terminal 120x.

Controllers/processors 1930x, 1930y and 1970 may direct the operation at base stations 110x and 110y and terminal 120x, respectively. Memories 1932a, 1932y and 1972 may store data and program codes for base stations 110x and 110y and terminal 120x, respectively. Schedulers 1934x and 1934y may schedule terminals communicating with base stations 110x and 110y, respectively, and may assign resources to the terminals.

The processors shown in FIG. 19 may perform various functions for the techniques described herein. For example, the processors at terminal 120x may direct or implement process 900 in FIG. 9, process 1100 in FIG. 11, process 1300 in FIG. 13, process 1500 in FIG. 15, and/or other processes for the techniques described herein. The processors at each base station 110 may direct or implement process 900 in FIG. 9, process 1300 in FIG. 13, process 1500 in FIG. 15, and/or other processes for the techniques described herein.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
    determining whether or not to transmit a power decision pilot by a station, the power decision pilot being indicative of transmit power to use for data transmission by the station in a future time period; and
    exchanging the power decision pilot if a determination is made to transmit the power decision pilot,
    wherein determining whether or not to transmit the power decision pilot includes statically determining not to transmit the power decision pilot based on a determination that a wireless system is a homogeneous wireless system.

2. The method of claim 1, wherein the station is a base station, and wherein the exchanging the power decision pilot comprises transmitting the power decision pilot by the base station.

3. The method of claim 2, wherein the determining whether or not to transmit the power decision pilot comprises determining to transmit the power decision pilot if the base station causes high interference to a terminal not served by the base station.

4. The method of claim 3, further comprising:
    determining whether the base station causes high interference to the terminal based on a pilot measurement report from the terminal.

5. A method for wireless communication, comprising:
    determining whether or not to transmit a power decision pilot by a base station, the power decision pilot being indicative of transmit power to use for data transmission by the station in a future time period; and
    transmitting the power decision pilot by the base station if a determination is made to transmit the power decision pilot,
    wherein the determining whether or not to transmit the power decision pilot comprises determining to transmit the power decision pilot if a terminal served by the base station observes high interference from a neighbor base station.

6. The method of claim 1, wherein the station is a terminal.

7. The method of claim 6, wherein the exchanging the power decision pilot comprises transmitting the power decision pilot by the terminal.

8. The method of claim 6, wherein the exchanging the power decision pilot comprises receiving the power decision pilot from the terminal by a serving base station.

9. The method of claim 6, wherein the determining whether or not to transmit the power decision pilot comprises determining to transmit the power decision pilot if the terminal causes high interference to a neighbor base station or if a serving base station of the terminal observes high interference from another terminal not served by the serving base station.

10. An apparatus for wireless communication, comprising:
    means for determining whether or not to transmit a power decision pilot by a station, the power decision pilot being indicative of transmit power to use for data transmission by the station in a future time period; and
    means for exchanging the power decision pilot if a determination is made to transmit the power decision pilot, wherein the means for determining whether or not to transmit the power decision pilot includes means for statically determining not to transmit the power decision pilot based on a determination that a wireless system is a homogeneous wireless system.

11. The apparatus of claim 10, wherein the station is a base station, and wherein the means for determining whether or not to transmit the power decision pilot comprises means for determining to transmit the power decision pilot if the base station causes high interference to a terminal not served by the base station or if a terminal served by the base station observes high interference from a neighbor base station.

12. The apparatus of claim 10, wherein the station is a terminal, and wherein the means for determining whether or not to transmit the power decision pilot comprises means for determining to transmit the power decision pilot if the terminal causes high interference to a neighbor base station or if a serving base station of the terminal observes high interference from another terminal not served by the serving base station.

13. An apparatus for wireless communication, comprising:
at least one processor configured to determine whether or not to transmit a power decision pilot by a station, the power decision pilot being indicative of transmit power to use for data transmission by the station in a future time period, and to exchange the power decision pilot if a determination is made to transmit the power decision pilot,
wherein the at least one processor is configured to determine whether or not to transmit the power decision pilot by statically determining not to transmit the power decision pilot based on a determination that a wireless system is a homogeneous wireless system.

14. The apparatus of claim 13, wherein the station is a base station, and wherein the at least one processor is configured to determine to transmit the power decision pilot if the base station causes high interference to a terminal not served by the base station or if a terminal served by the base station observes high interference from a neighbor base station.

15. The apparatus of claim 13, wherein the station is a terminal, and wherein the at least one processor is configured to determine to transmit the power decision pilot if the terminal causes high interference to a neighbor base station or if a serving base station of the terminal observes high interference from another terminal not served by the serving base station.

16. A computer program product, comprising:
a non-transitory computer-readable medium comprising:
code for causing at least one computer to determine whether or not to transmit a power decision pilot by a station, the power decision pilot being indicative of transmit power to use for data transmission by the station in a future time period, and
code for causing the at least one computer to exchange the power decision pilot if a determination is made to transmit the power decision pilot,
wherein the code for determining whether or not to transmit the power decision pilot includes code for statically determining not to transmit the power decision pilot based on a determination that a wireless system is a homogeneous wireless system.

17. An apparatus for wireless communication, comprising:
means for determining whether or not to transmit a power decision pilot by a base station, the power decision pilot being indicative of transmit power to use for data transmission by the station in a future time period; and
means for transmitting the power decision pilot by the base station if a determination is made to transmit the power decision pilot,
wherein the means for determining whether or not to transmit the power decision pilot comprises means for determining to transmit the power decision pilot if a terminal served by the base station observes high interference from a neighbor base station.

18. An apparatus for wireless communication, comprising:
at least one processor configured to determine whether or not to transmit a power decision pilot by a base station, the power decision pilot being indicative of transmit power to use for data transmission by the station in a future time period, and to transmit the power decision pilot by the base station if a determination is made to transmit the power decision pilot,
wherein the at least one processor is configured to determine to transmit the power decision pilot if a terminal served by the base station observes high interference from a neighbor base station.

* * * * *